May 16, 1939. A. F. HODGKINS ET AL 2,158,579
APPARATUS FOR RECONDITIONING OR PAINTING PIPE LINES
Filed May 21, 1937
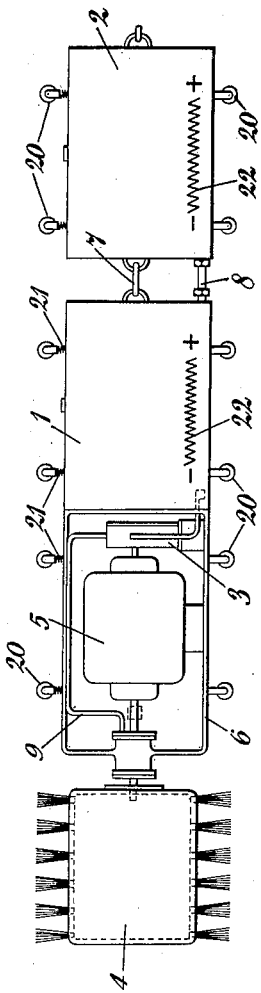
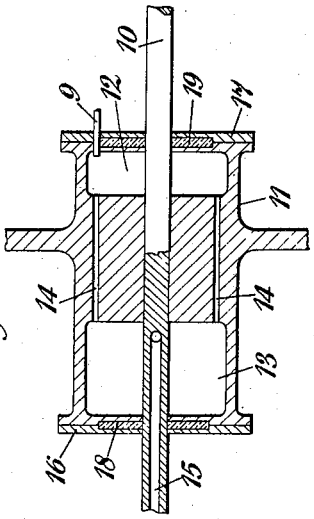
INVENTORS
A. F. Hodgkins and
A. M. C. Jameson
By
Attorneys Patented May 16, 1939

2,158,579

UNITED STATES PATENT OFFICE 2,158,579

APPARATUS FOR RECONDITIONING OR PAINTING PIPE LINES

Albert Frederick Hodgkins and Arthur Martin Colthurst Jameson, Slough, England

Application May 21, 1937, Serial No. 144,076
In Great Britain May 4, 1937

9 Claims. (Cl. 91—39)

This invention relates to apparatus for painting pipe lines (by which is meant for the purposes of this specification, pipe lines for the conveyance of water, gas, factory liquors and the like) with liquid coating media. The invention is concerned more especially with apparatus for painting pipe lines in situ in the ground, the structure of the building or other position in which they are laid. It is to be understood, however, that the invention is also applicable to the painting of pipe lines removed from the place whereat they have been laid, and also to the painting of new pipe lines (which term includes individual component pipes thereof) before they are laid.

A principal object of the invention has been to provide a simple and efficient form of apparatus for this purpose which can be employed in the reconditioning of a pipe line, by which is meant, in the sense in which the expression is used herein, a treatment involving the removal of incrustations and like deposits of hard material upon the interior surface of a pipe line, followed by a painting of the surface of the pipe line from which the incrustation or like deposit has been removed, for example, with a coating of protective or anti-corrosive paint.

Various constructions of apparatus for painting pipe lines with liquid coating media are known. These known constructions, however, are disadvantageous for various reasons and it has been the aim in the present invention to provide an improved construction which will be free from the disadvantages of the known constructions, and at the same time shall be highly efficient in operation and adapted to the requirements of a wide range of pipe line sizes, that is to say, shall, without departure from its general design and manner of operation be capable of being made in a large variety of sizes to suit the diameter of a wide range of pipe lines in respect of diameter thereof, the apparatus being of a character, moreover, enabling it to be used for the painting of practically any length of pipe line, up to, say, 600 feet or more, without the slightest fear of failure or defect in its operation, which, of course, is a highly important consideration in the case, for example, of water mains, gas mains and the like which require a high order of protection from corrosion upon their internal surfaces in order that they shall remain in serviceable condition below the ground or wherever they happen to be laid for a long time.

With this object in view, an important feature of the improved construction of painting apparatus which is provided by the present invention is that the apparatus is in the form of an entirely self-contained unit which is traversable as such and therefore to any required distance along the interior of a pipe line, thus rendering it substantially immaterial how long the pipe line is. In some of the known constructions, the paint or other coating medium has been supplied to the painting unit during the traverse thereof along the pipe line by way of a long supply pipe connected to a pump at the end of the pipe line. This arrangement, however, is disadvantageous in that it very considerably limits the length of the pipe line which in practice can be painted with the use of the apparatus, due to the resistance which the supply pipe offers to the flow of coating medium therethrough and the consequent loss of pressure at the delivery end of the pipe. This difficulty is completely obviated with an entirely self-contained unit such as is in view in the present invention and the full working pressure of the pumping means of the apparatus by which the coating medium is fed to the point of delivery thereof is immediately available without diminution by extensive resistances to the flow of the coating medium to the said point so that not only can the unit be used upon practically any length of pipe line for the reason above indicated, but the power means for driving the pump which conveys the coating medium to the point of delivery thereof may be of a relatively low order of power, thus reducing the cost of production of the unit, lessening the weight thereof and consequently the power required to traverse the unit along the pipe line and enabling the general design of the apparatus to be applied to a unit for the painting of quite small diameter pipe lines as well as the larger sizes of pipe line.

A further feature of the improved construction of painting apparatus which is provided in accordance with the present invention is that the point of delivery of the coating medium from the pressure supply thereof from the pump is in the immediate neighbourhood of the roots of the bristles of a rotary brush which is concentric with the pipe line when the unit is in position therein and is of a size sufficient completely to fill the section of the pipe line. In this way it is ensured that the liquid coating medium shall be in the most effective manner applied to the surface of the wall of the pipe line, reaching every part of said surface and being uniformly distributed thereover by the bristles of the brush. It is found that in this way it is possible to coat the interior of not only relatively small diameter pipe lines but even very large diameter pipe lines, up to several feet in diameter, with anti-corrosive paint or a like liquid coating medium and as the apparatus is, as above described, an entirely self-contained unit and its action is uniform wherever the unit may be along the pipe line, the perfect coating of the interior of the pipe line is ensured irrespective of the length of the pipe line.

According to its broadest aspect, therefore, the invention provides an apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; a motor; a rotary brush which is so positioned in the unit as when the unit is in position in the pipe line to be concentric therewith, is of a size completely to fill the section of the pipe line and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; and means placing the reservoir in communication with the pump and the pump in turn in communication with the brush for the conveyance under the action of the pump and by way thereof of coating medium from the reservoir to the brush.

As will be understood, the frictional resistance of the bristles of the brush with the wall of the pipe line in the use of the apparatus produces a certain amount of torque upon the unit tending to rotate the latter as it is moved through the pipe line. It is found to be important that such rotation of the unit should be prevented, and according to a further feature of the invention, the reservoir, motor, pump and brush are supported together in a frame which is provided upon its exterior with anti-friction bearing elements which, besides minimizing the resistance to motion of the unit along the pipe line by reason of their anti-friction character, are spring-pressed in directions radially outward of the unit so as to bear with sufficient pressure upon the wall of the pipe line to prevent any rotation of the unit therein due to the torque of rotation referred to of the apparatus.

According to a further feature of the invention, more especially in the case of an apparatus for use upon very long lengths of pipe line or for applying coating medium at relatively high rates of application to the surface of the pipe line to be coated, the reservoir means of the apparatus for containing the supply of coating medium may include at least one additional reservoir flexibly coupled to the unit so as to follow along in train therewith and behind it and communicating also by flexible conduit means with the reservoir of the unit so as in effect to form an extension thereof, the additional reservoir being provided on its exterior with anti-friction bearing means, as in the case of the unit in front of it.

The invention will now be further described with reference to the accompanying drawing, which illustrates a preferred embodiment of the invention by way of example.

In the drawing:

Figure 1 is an elevational view of the improved painting apparatus of the invention, and Figure 2 is a longitudinal cross-section through a part of the painting apparatus shown in Figure 1 but drawn on a larger scale than that figure.

Before proceeding to describe the painting apparatus, it will be convenient to delineate a reconditioning process in which the apparatus is employed, as follows:—

The process comprises the following operations performed in the sequence named:

1. De-incrusting the pipe line for example by traversing therethrough the de-incrusting tool forming the subject matter of our application Serial No. 249,134, filed January 3, 1939, divided out of the present applicaiton.

2. Removing the detached incrustation matter from the interior of the pipe line, preferably by flushing the latter out with a stream of water; although, if desired, this operation may be performed simultaneously with the de-incrusting operation by flushing the pipe line with the stream of water all the time the de-incrusting tool is being traversed through the pipe line.

3. Removing residual incrustation matter from the interior of the pipe line and at the same time removing residual and adherent water therefrom, for example by drawing a wire brush in train with a squeegee incrusted pipe line, as described in the specification of said application Serial No. 249,134, filed January 3, 1939.

4. Drying the surface of the pipe line by passing a current of heated or dry air therethrough.

5. Painting the dried interior of the pipe line by traversing the painting apparatus of this invention therethrough.

6. Drying the coating of paint thus applied to the interior of the pipe line by passing therethrough a current of heated or dry air.

7. Applying as many further coats of paint or the like to the interior of the pipe line as may be necessary, with the interposition between each coating operation and the next of a drying step.

Referring now to the painting apparatus as shown in the drawing, this comprises briefly a pair of cylindrical reservoirs 1, 2 for the coating medium; a pump 3, for pumping the coating medium from the reservoirs through a rotary brush 4 to the surface of the pipe line, and an electric motor 5 drivingly connected to the pump and also to the rotary brush. The motor 5 and the pump 3 are mounted in a surrounding frame 6. If desired, an air motor or any other convenient form of prime mover may be employed in place of the electric motor 5, although in the main an electric motor is preferably employed, as with it, a longer length of pipe line can practicably be painted than with a compressed air motor, on account of the fact that with an electric motor possible difficulties arising from loss of operating air pressure in the supply of air to an air motor are eliminated.

The reservoirs 1, 2 are of a diameter somewhat less than the internal diameter of the pipe line to be painted and it is in order to accommodate possible bends in the pipe line that two reservoirs of relatively short length are employed, the two reservoirs being coupled together by a flexible coupling 7. Where possible, however, in this sense, a single reservoir may, if desired, be employed, or where the length of the pipe line to be painted is such, having regard to the diameter of the pipe, as to render, say, two reservoirs insufficient in capacity to hold all of the paint or other coating composition required for the coating of the pipe line, three or four flexibly connected reservoirs may be employed. The two or more reservoirs 1, 2 communicate with one another for the flow of paint or the like from one to the other by way of a flexible connecting pipe 8, composed, for example of rubber hose.

The paint is pumped under pressure from the reservoirs by way of the pump 3 and a pipe 9 into the body of the brush 4, which body is hollow and has the bristles of the brush set or mounted in it so that they radiate from the surface of the body. The overall diameter of the brush is somewhat in excess of the internal diameter of the pipe line to be painted and between the bristles are small holes in the wall of the hollow body of the brush through which the paint can escape and find its way on to and among the bristles, which thus are caused to apply the paint to the wall of the pipe line as the painting tool is traversed therethrough. The quantity of paint supplied to the brush depends, of course, upon the size of the pipe line to be painted. Also the speed of the motor 5 is adjusted to suit the rate of operation of the pump 3 and the necessary speed of rotation of the brush.

As shown in Figure 2, in order to enable the paint to enter the interior of the brush, the motor shaft 10 is carried through a special bearing in the form of a hollow boss 11 having in it two internal chambers 12, 13 which communicate with one another by way of paint passages 14, and of which the chamber 12 communicates by way of the pipe 9 with the pump 3 while the other chamber 13 communicates with the interior of the brush by way of a paint passage 15 extending along the interior of the shaft 10, which is hollow for this purpose. Upon the ends of the boss 11 are plates 16, 17 which enclose between them and the end walls of the boss, fibre washers 18, 19 serving to maintain a tight joint where the shaft 10 extends through the ends of the boss.

To enable the apparatus to run smoothly through the pipe line, its several rigid parts are preferably mounted upon wheels or runners 20 spaced as required along the length of the apparatus, and in order to prevent it from turning owing to the torque of the brush, a number of the said wheels or runners may if desired be held against the sides of the pipe by means of springs 21 incorporated in the mountings of the wheels or runners.

The painting apparatus above described, which thus constitutes an entirely self-contained mechanical painting unit, is drawn through the pipe line by means of a cable to which is attached an electric supply cable for the current to the motor 5.

In order to get the supply cable for the electric motor 5 of the painting apparatus and also the wire rope or the like for drawing this apparatus, through the pipe line, a light cable is sent through the pipe first. This may be effected by blowing air through the pipe against a disc slightly smaller in diameter than the pipe and mounted on small wheels, the light cable being attached to the wheeled disc so as to be drawn along the pipe therewith as the disc is blown therealong. When the light cable is through the pipe, the wire rope and the electric cable, which are bound together, are drawn through the section of the pipe line, whereupon the painting apparatus is attached to the rear end of the rope and cable. The painting apparatus is then drawn through the pipe line by means of a winch on to which the wire rope and supply cable to the motor are wound.

In order to enable the painting unit to be employed for the application of a coating of protective material which requires to be applied in heated condition, electric heaters 22 (shown diagrammatically in chain line in Figure 1) may if desired be incorporated in the paint reservoir or reservoirs 1, 2, the said heaters being adapted to maintain the paint at the requisite temperature for the painting operation and being supplied with electric current by way of a supply cable therefor bound together with the supply cable for the current to the motor 5. Instead of electric heaters for this purpose, gas-fired heaters could if desired be used.

What we claim as our invention and desire to secure by Letters Patent of the United States is:

1. Apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; a motor; a rotary brush which is so positioned in the unit as when the unit is in position in the pipe line to be concentric therewith, is of a size completely to fill the section of the pipe line, and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; and means placing the reservoir in communication with the pump and the pump in turn in communication with the brush for the conveyance under the action of the pump and by way thereof of coating medium from the reservoir to the brush.

2. Apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; a motor; a rotary brush which is so positioned in the unit as when the unit is in position in the pipe line to be concentric therewith, is of a size completely to fill the section of the pipe line and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; means placing the reservoir in communication with the pump and the pump in turn in communication with the brush for the conveyance under the action of the pump and by way thereof of coating medium from the reservoir to the brush; a frame supporting the whole of the foregoing parts as a rigid entity; and anti-friction bearing elements on the exterior of the frame for minimizing the resistance of motion thereof in the traverse of the unit along the pipe line.

3. Apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; a motor; a rotary brush which is so positioned in the unit as when the unit is in position in the pipe line to be concentric therewith, is of a size completely to fill the section of the pipe line and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; means placing the reservoir in communication with the pump and the pump in turn in communication with the brush for the conveyance under the action of the pump and by way thereof of coating medium from the reservoir to the brush; a frame supporting the whole of the foregoing parts as a rigid entity; and anti-friction bearing elements on the exterior of the frame operative to minimize the resistance to motion of the unit along the pipe line and normally urged by spring means radially outward of the unit so as also to assist in preventing rotation of the unit in the pipe line due to the torque of rotation of the brush.

4. Apparatus for painting the interior surface of a pipe line with liquid coating medium, which comprises the parts specified in claim 1, in combination with at least one additional reservoir flexibly coupled to the unit so as to follow along in train therewith as the unit is traversed through the pipe line and communicating also by way of flexible conduit means with the reservoir of the unit so as to form in effect an extension thereof, the additional reservoir being provided upon its exterior with anti-friction bearing elements similar to those upon the exterior of the unit.

5. Apparatus for painting the interior surface of a pipe line with a liquid coating medium which requires to be applied in a heated condition, which comprises the parts specified in claim 1 in combination with means incorporated in the reservoir for heating the content of coating medium therein.

6. Apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; an electric motor; a rotary brush which is so positioned in the unit as when the unit is in position in the pipe line to be concentric therewith, is of a size completely to fill the section of the pipe line and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; and means placing the reservoir in communication with the pump and the pump in turn in communication with the brush for the conveyance under the action of the pump and by way thereof of coating medium from the reservoir to the brush.

7. Apparatus for painting the interior surface of a pipe line with a liquid coating medium, which comprises in combination and in the form of a self-contained power-operated mechanical painting unit adapted to be traversed as such through the pipe line to be painted, a reservoir for the coating medium; a pump; an electric motor; a rotary brush which is so positioned in the unit as when the unit is in position in the pipe line to be concentric therewith, is of a size completely to fill the section of the pipe line and is formed with a hollow cylindrical body which carries the bristles of the brush upon its peripheral wall and is perforated in said peripheral wall for the issuance therethrough of coating medium pumped into the interior of the body by way of the pump from the reservoir; means drivingly connecting the motor to the pump and also to the brush; means placing the reservoir in communication with the pump and the pump in turn in communication with the brush for the conveyance under the action of the pump and by way thereof of coating medium from the reservoir to the brush; a frame supporting the whole of the foregoing parts as a rigid entity; and anti-friction bearing elements on the exterior of the frame operative to minimize the resistance to motion of the unit along the pipe line and normally urged by spring means radially outward of the unit so as also to assist in preventing rotation of the unit in the pipe line due to the torque of rotation of the brush.

8. Apparatus for painting the interior surface of a pipe line with a liquid coating medium, which comprises the parts specified in claim 1, in a form in which the means drivingly connecting the motor to the brush comprises a shaft which extends fluid-tightly through a hollow bearing boss, the interior of which communicates with the pump on the one hand and by way of an internal passage in the shaft leading from the periphery thereof with the interior of the body of the brush on the other.

9. Apparatus for painting the interior surface of a pipe line with a liquid coating medium, which comprises the parts specified in claim 3, in a form in which the means drivingly connecting the motor to the brush comprises a shaft which extends fluid-tightly through a hollow bearing boss which is incorporated in the frame and the interior of which communicates with the pump on the one hand and by way of an internal passage in the shaft leading from the periphery thereof with the interior of the body of the brush on the other.

ALBERT FREDERICK HODGKINS.
ARTHUR MARTIN COLTHURST JAMESON.